US010533623B2

(12) United States Patent
Tomiuga

(10) Patent No.: US 10,533,623 B2
(45) Date of Patent: Jan. 14, 2020

(54) FRONT FORK

(71) Applicant: KYB MOTORCYCLE SUSPENSION Co., Ltd., Kani-shi, Gifu (JP)

(72) Inventor: Takeshi Tomiuga, Gifu (JP)

(73) Assignee: KYB MOTORCYCLE SUSPENSION CO., LTD., Kani-Shi, Gifu (JP)

( * ) Notice: Subject to any disclaimer, the term of this patent is extended or adjusted under 35 U.S.C. 154(b) by 0 days.

(21) Appl. No.: 15/558,627

(22) PCT Filed: Mar. 4, 2016

(86) PCT No.: PCT/JP2016/056753
§ 371 (c)(1),
(2) Date: Sep. 15, 2017

(87) PCT Pub. No.: WO2016/147905
PCT Pub. Date: Sep. 22, 2016

(65) Prior Publication Data
US 2018/0087594 A1    Mar. 29, 2018

(30) Foreign Application Priority Data
Mar. 18, 2015   (JP) ................................. 2015-055287

(51) Int. Cl.
*F16F 9/34*  (2006.01)
*B62K 25/08* (2006.01)
(Continued)

(52) U.S. Cl.
CPC ............ *F16F 9/3405* (2013.01); *B62K 25/08* (2013.01); *F16F 9/067* (2013.01); *F16F 9/18* (2013.01);
(Continued)

(58) Field of Classification Search
CPC .......... F16F 9/3405; F16F 9/18; F16F 13/007; F16F 9/3228; F16F 9/32; F16F 9/516; F16F 9/067; B62K 25/08
(Continued)

(56) References Cited

U.S. PATENT DOCUMENTS

| 7,240,775 B2 * | 7/2007 | Nagai .................... F16F 9/49 188/266 |
| 2005/0145456 A1 * | 7/2005 | Tomonaga ............. B62K 25/08 188/297 |

(Continued)

FOREIGN PATENT DOCUMENTS

| JP | S48-031650 A | 4/1973 |
| JP | S49-15583 U | 10/1974 |

(Continued)

*Primary Examiner* — Pamela Rodriguez
(74) *Attorney, Agent, or Firm* — Rabin & Berdo, P.C.

(57) ABSTRACT

A front fork includes a tubular cylinder; a free piston slidably inserted into the cylinder to partition the cylinder into a pressure chamber and a reservoir; a piston slidably inserted into the cylinder to partition the pressure chamber into an extension-side chamber and a contraction-side chamber; a piston rod having one end connected to the piston and the other end side extending oppositely to the free piston side and protruding outward of the cylinder; a passage configured to allow the pressure chamber and the reservoir to communicate with each other; and a check valve provided in the passage and configured to allow only a flow of the hydraulic fluid from the reservoir to the pressure chamber.

7 Claims, 6 Drawing Sheets

(51) Int. Cl.
   *F16F 9/32* (2006.01)
   *F16F 9/516* (2006.01)
   *F16F 9/06* (2006.01)
   *F16F 9/18* (2006.01)
   *F16F 13/00* (2006.01)

(52) U.S. Cl.
   CPC .............. *F16F 9/32* (2013.01); *F16F 9/3228* (2013.01); *F16F 9/516* (2013.01); *F16F 13/007* (2013.01)

(58) Field of Classification Search
   USPC .......... 188/315, 313, 314, 316, 317, 322.13, 188/322.14, 352; 267/64.15, 64.26, 64.28
   See application file for complete search history.

(56) References Cited

U.S. PATENT DOCUMENTS

2012/0152671 A1* 6/2012 Murakami .............. F16F 9/187 188/315
2013/0256070 A1* 10/2013 Murakami .............. F16F 9/185 188/315

FOREIGN PATENT DOCUMENTS

| JP | S56-76588 U | | 6/1981 |
| JP | 2006170243 A | * | 6/2006 |
| JP | 2006-329372 A | | 12/2006 |
| JP | 2008256059 A | * | 10/2008 |
| WO | WO-2016/047471 A1 | * | 3/2016 |

* cited by examiner

FRONT FORK

TECHNICAL FIELD

The present invention relates to a front fork.

BACKGROUND ART

In the prior art, there is known a front fork for suspending a front wheel of a saddle type vehicle such as a two-wheel vehicle or a three-wheel vehicle, the front fork including a cylinder, a piston slidably inserted into the cylinder to partition the cylinder into an extension-side chamber and a contraction-side chamber, and a free piston having one end connected to the piston and the other end extending outward of the cylinder. In this front fork, a damping force is generated by virtue of a differential pressure between the extension-side chamber and the contraction-side chamber.

For example, in a front fork discussed in JP 2006-329372 A, a pressure chamber filled with a hydraulic fluid and a reservoir enclosed with a hydraulic fluid and a gas are partitioned by the free piston, and the free piston is biased to the pressure chamber side by a pressurizing spring. In this configuration, the pressure chamber is pressurized by the free piston and the pressurizing spring, so that it is possible to obtain excellent damping force responsiveness.

SUMMARY OF INVENTION

Here, a case where the free piston moves toward the pressure chamber will be referred to as advancement, and a case where the free piston moves oppositely will be referred to as retreat. In the front fork provided with the pressurizing spring, in order to prevent a strange noise, a forward movement of the free piston is restricted not to advance farther than a predetermined length, and separation between the pressurizing spring and the free piston is prevented in some cases. However, in this case, responsiveness for generating the damping force may be degraded.

Specifically, for example, if the front fork is continuously extended while a volume of the hydraulic fluid is reduced by a temperature decrease, the piston rod may retreat from the cylinder while the forward movement of the free piston is restricted in some cases. In this case, the expanding contraction-side chamber may have a negative pressure and generate bubbles. As a result, the pressure of the contraction-side chamber may not rapidly increase in the subsequent contraction stroke, and a delay may occur in generation of the damping force. Such a phenomenon is not limited to a case where the pressurizing spring is installed and may occur also when the hydraulic fluid is deficient in the pressure chamber The present invention provides a front fork capable of maintaining excellent damping force responsiveness.

According to one aspect of the present invention, a front fork includes: a tubular cylinder; a free piston slidably inserted into the cylinder to partition the cylinder into a pressure chamber filled with a hydraulic fluid and a reservoir enclosed with a hydraulic fluid and a gas; a piston slidably inserted into the cylinder to partition the pressure chamber into an extension-side chamber and a contraction-side chamber; a piston rod having one end connected to the piston and the other end side extending oppositely to the free piston side and protruding outward of the cylinder; a passage configured to allow the pressure chamber and the reservoir to communicate with each other; and a check valve provided in the passage and configured to allow only a flow of the hydraulic fluid from the reservoir to the pressure chamber.

DESCRIPTION OF EMBODIMENTS

Embodiments of the present invention will now be described with reference to the accompanying drawings.

<First Embodiment>

Figure 2:
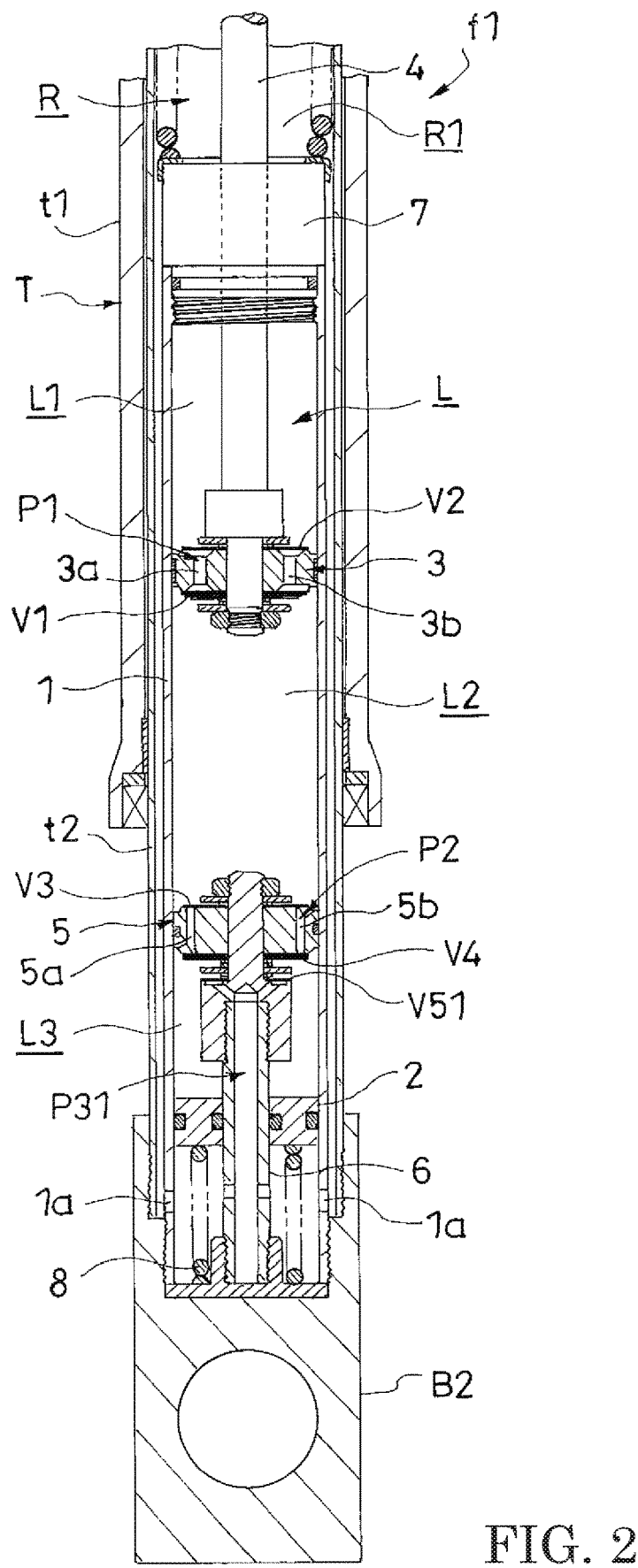
FIG. 2 is a longitudinal cross-sectional view illustrating main parts of the front fork of FIG. 1.

As illustrated in FIG. 2, a front fork F according to the first embodiment of the invention includes a tubular cylinder 1, a free piston 2 slidably inserted into the cylinder 1 to partition the cylinder 1 into a pressure chamber L filled with a hydraulic fluid and a reservoir R enclosed with a hydraulic fluid and a gas, a piston 3 slidably inserted into the cylinder 1 to partition the pressure chamber L into the extension-side chamber L1 and the contraction-side chamber L2, a piston rod 4 having one end connected to the piston 3 and the other end side extending oppositely to the free piston and protruding outward of the cylinder 1, a supply passage (passage) P31 that allows the pressure chamber L and the reservoir R to communicate with each other, and a leaf valve (check valve) V51 provided in the supply passage P31 to allow only a flow of the hydraulic fluid from the reservoir R to the pressure chamber L.

Figure 1:
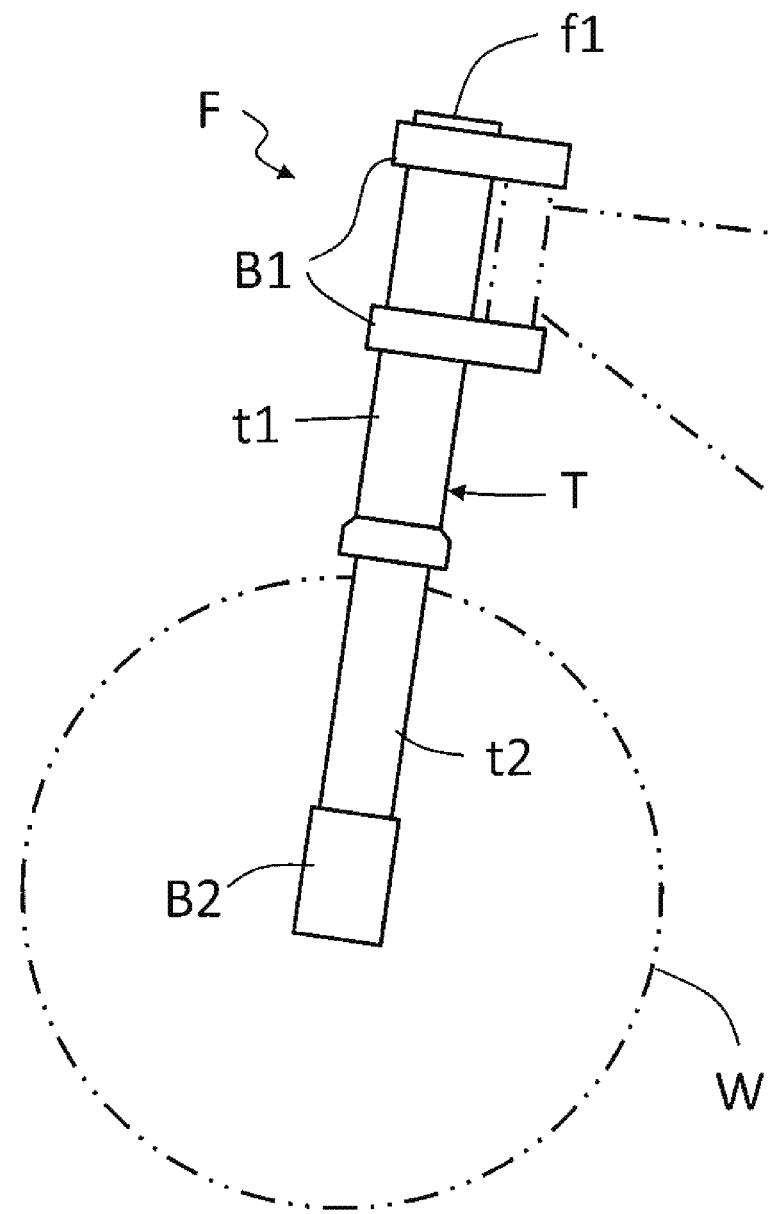
FIG. 1 is a simplified side view illustrating an installation state of a front fork according to a first embodiment of the invention.

As illustrated in FIG. 1, the front fork F suspends a front wheel W of a saddle type vehicle such as a two-wheel vehicle or a three-wheel vehicle. The front fork F includes a fork tube fl that supports the front wheel W and has the aforementioned configuration, a chassis-side bracket B1 that connects the fork tube fl to a chassis frame serving as a frame of the chassis, and a wheel-side bracket B2 that connects the fork tube fl to an axle of the front wheel W. The fork tube fl includes a tubular member T including an outer tube t1 serving as an outer shell of the fork tube fl and an inner tube t2 moved into or out of the outer tube t1. The chassis-side bracket B1 is connected to the outer tube t1, and the wheel-side bracket B2 is connected to the inner tube t2. For this reason, as an impact caused by an uneven road surface is input to the front wheel W, the inner tube t2 moved into or out of the outer tube t1, and the front fork F is extended or contracted.

According to this embodiment, the front fork F is an inverted type in which the outer tube t1 is connected to the chassis side, and the inner tube t2 is connected to the wheel side. However, the configuration of the front fork F may change arbitrarily without limiting to that illustrated in the drawings. For example, the front fork F may be an upright type in which the outer tube t1 is connected to the wheel side, and the inner tube t2 is connected to the chassis side.

As illustrated in FIG. 2, the fork tube f1 includes a tubular member T including the outer tube t1 and the inner tube t2, a cap member (not shown) that blocks an upper opening of the tubular member T, a cylinder 1 connected to the wheel-side bracket B2 and erected on a shaft center of the inner tube t2, an annular rod guide 7 that blocks an upper opening of the cylinder 1 in FIG. 2, a piston rod 4 having an upper end of FIG. 2 connected to the cap member and a lower side of FIG. 2 supported by the rod guide 7 and inserted into the cylinder 1, a piston 3 held on an outer circumference of the lower end of FIG. 2 of the piston rod 4 to slidably make contact with an inner circumferential surface of the cylinder 1, a bottom rod 6 erected on a center of the cylinder 1 oppositely to the piston rod 4 side, a base member 5 held on an outer circumference of an upper end of FIG. 2 of the bottom rod 6, a free piston 2 that slidably makes contact with the an outer circumferential surface of the bottom rod 6 and an inner circumferential surface of the cylinder 1, and a pressurizing spring 8 provided in the lower side of FIG. 2 of the free piston 2.

Inside the cylinder 1, a pressure chamber L is formed between the rod guide 7 and the free piston 2. The pressure chamber L is filled with a hydraulic fluid. The pressure chamber L is bisected by each of the piston 3 and the base member 5 along an axial direction of the cylinder 1 so as to form an extension-side chamber L1 provided between the rod guide 7 and the piston 3, a contraction-side chamber L2 provided between the piston 3 and the base member 5, and a pressurizing chamber L3 provided between the base member 5 and the free piston 2. That is, the extension-side chamber L1 and the contraction-side chamber L2 are partitioned by the piston 3, and the contraction-side chamber L2 and the pressurizing chamber L3 are partitioned by the base member 5.

A reservoir R is provided between the tubular member T and the outside of the cylinder 1. A hydraulic fluid is stored in the reservoir R, and a gas is enclosed in the upper side from its liquid surface. The reservoir R includes a hydraulic reservoir R1 where a hydraulic fluid is stored and a gas chamber (not shown) where a gas is enclosed. The cylinder 1 is provided with through holes 1a in the lower side of FIG. 2 under a sliding range of the free piston 2 to allow the inner and outer sides of the cylinder 1 to communicate with each other. The through holes 1a are designed not to be narrow. That is, the hydraulic reservoir R1 extends from the outside of the cylinder 1 to the lower side of FIG. 2 of the free piston 2 inside the cylinder 1 and is partitioned into the free piston 2 and the pressurizing chamber L3.

The extension-side chamber L1 and the contraction-side chamber L2 communicate with each other through a passage P1. The contraction-side chamber L2 and the pressurizing chamber L3 communicate with each other through a passage P2. The pressurizing chamber L3 and the hydraulic reservoir R1 communicate with each other through a passage P31. In order to distinguish each passage P1, P2, and P31, a passage through which the extension-side chamber L1 and the contraction-side chamber L2 communicate with each other will be referred to as a first passage P1. A passage through which the contraction-side chamber L2 and the pressurizing chamber L3 communicate with each other will be referred to as a second passage P2. A passage through which the pressurizing chamber L3 and the hydraulic reservoir R1 communicate with each other will be referred to as a supply passage P31. The first passage P1 allows a bidirectional flow of the hydraulic fluid flowing between the extension-side chamber L1 and the contraction-side chamber L2. The second passage P2 allows a bidirectional flow of the hydraulic fluid flowing between the contraction-side chamber L2 and the pressurizing chamber L3. The supply passage P31 allows a unidirectional flow of the hydraulic fluid directed from the hydraulic reservoir R1 to the pressurizing chamber L3.

The piston 3 that partitions the extension-side chamber L1 and the contraction-side chamber L2 is provided with an extension-side passage 3a and a contraction-side passage 3b included in the first passage P1, and an extension-side leaf valve V1 that opens or closes the extension-side passage 3a and a contraction-side leaf valve V2 that opens or closes the contraction-side passage 3b are stacked on the piston 3. The extension-side leaf valve V1 is a damping valve that allows a flow of the hydraulic fluid directed from the extension-side chamber L1 to the contraction-side chamber L2 through the extension-side passage 3a, applies a resistance to this flow, and suppresses an opposite flow. The contraction-side leaf valve V2 is a check valve that allows a flow of the hydraulic fluid directed from the contraction-side chamber L2 to the extension-side chamber L1 through the contraction-side passage 3b and suppresses an opposite flow.

In this manner, according to this embodiment, the extension-side passage 3a and the contraction-side passage 3b set as a unidirectional passage constitute the first passage P1. For this reason, it is possible to set a resistance to the hydraulic fluid flow depending on a direction of the hydraulic fluid passing through the first passage P1. However, the configuration of the first passage P1 and the configuration of the valve provided in the first passage P1 may change arbitrarily depending on a desired damping force characteristic without limiting to those described above. For example, the first passage P1 may be a sort of passage that allows a bidirectional flow and may be provided with an orifice in the middle of the passage.

The base member 5 that partitions the contraction-side chamber L2 and the pressurizing chamber L3 is provided with an extension-side passage 5a and a contraction-side passage 5b included in the second passage P2, and an extension-side leaf valve V3 that opens or closes the extension-side passage 5a and a contraction-side leaf valve V4 that opens or closes the contraction-side passage 5b are stacked on the base member 5. The extension-side leaf valve V3 is a check valve that allows a flow of the hydraulic fluid directed from the pressurizing chamber L3 to the contraction-side chamber L2 through the extension-side passage 5a and suppresses an opposite flow. The contraction-side leaf valve V4 is a damping valve that allows a flow of the hydraulic fluid directed from the contraction-side chamber L2 to the pressurizing chamber L3 through the contraction-side passage 5b, applies a resistance to this flow, and suppresses an opposite flow.

In this manner, according to this embodiment, the extension-side passage 5a and the contraction-side passage 5b set as a unidirectional passage constitute the second passage P2. For this reason, it is possible to set a resistance to the hydraulic fluid flow depending on the direction of the hydraulic fluid passing through the second passage P2. However, the configuration of the second passage P2 and the configuration of the valve provided in the second passage P2 may change arbitrarily depending on a desired damping force characteristic without limiting to those described above. For example, the second passage P2 may be a sort of passage that allows a bidirectional flow and may be provided with an orifice in the middle of the passage.

Figure 3:
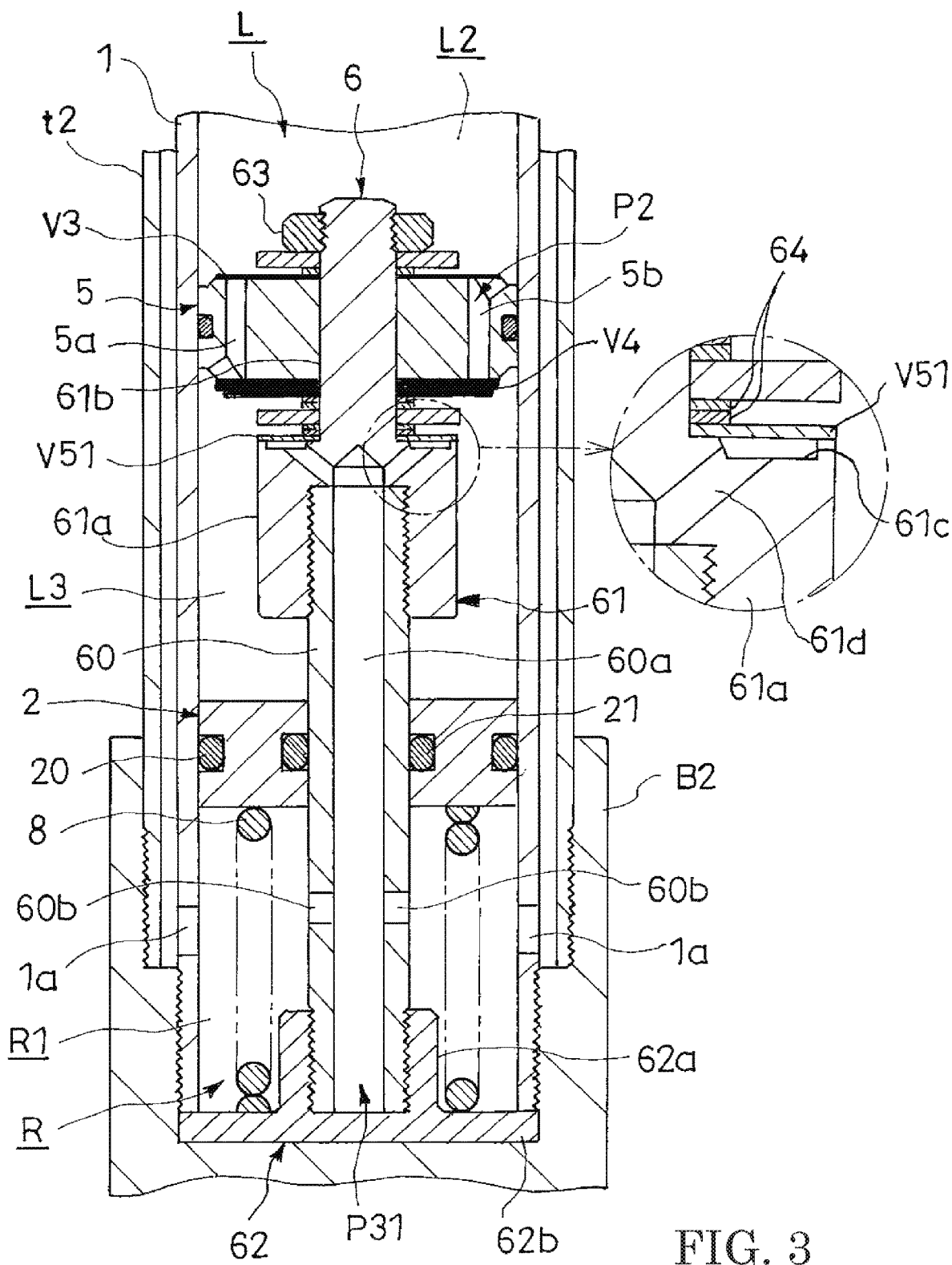
FIG. 3 is an enlarged view illustrating a part of FIG. 2.

As illustrated in FIG. 3, the bottom rod 6 that holds the base member 5 includes a tubular shaft member 60, a valve holding member 61 installed in an outer circumference of one end of the shaft member 60, and a support member 62 installed in an outer circumference of the other end of the shaft member 60.

The shaft member 60 is provided with an axial hole 60a penetrating a core of the shaft member 60 and lateral through holes 60b that allow the axial hole 60a and the hydraulic reservoir R1 to communicate with each other. The lateral through holes 60b are provided under a sliding range of the free piston 2 to allow the hydraulic reservoir R1 and the axial hole 60a to communicate with each other at all times. Alternatively, a hole or a groove may be provided in the support member 62, and the lateral through hole 60b may be omitted as long as the axial hole 60a and the hydraulic reservoir R1 are allowed to communicate with each other.

The valve holding member 61 includes a connecting portion 61a formed in a capped tubular shape and screwed to an outer circumference of the shaft member 60, and an installation portion 61b extending upward in FIG. 3 from the connecting portion 61a and having an outer diameter smaller than that of the connecting portion 61a. The installation portion 61b penetrates the center holes of the base member 5, the extension-side leaf valve V3, and the contraction-side leaf valve V4, and a nut 63 is screwed to the outer circumference of the installation portion 61b protruding upward. As a result, the base member 5, the extension-side leaf valve V3, and the contraction-side leaf valve V4 are interposed and held between the nut 63 screwed to the tip of the installation portion 61b and the connecting portion 61a overhanging outward from the installation portion 61b.

An annular groove 61c surrounding the installation portion 61b is formed on a top portion (upper portion of FIG. 3) of the connecting portion 61a. In addition, the connecting portion 61a is provided with a communicating hole 61d that allows the groove 61c and the inside of the connecting portion 61a to communicate with each other. An inner opening of the communicating hole 61d communicates with the inside of the shaft member 60 screwed to the connecting portion 61a. The groove 61c, the communicating hole 61d, the axial hole 60a, and the lateral through holes 60b constitute the supply passage P31 that allows the pressurizing chamber L3 and the hydraulic reservoir R1 to communicate with each other.

According to this embodiment, the shaft member 60 and the valve holding member 61 are individually formed and are assembled with each other by screwing so as to form the bottom rod 6. For this reason, it is possible to easily form the supply passage P31 and simplify the shapes of the shaft member 60 and the valve holding member 61. Therefore, it is possible to easily form the bottom rod 6 and reduce the manufacturing cost of the front fork F.

A leaf valve V51 is installed between the connecting portion 61a and the base member 5 so that the supply passage P31 is opened or closed by the leaf valve V51. Specifically, the leaf valve V51 is fixed by nipping its inner circumference side between the nut 63 and the connecting portion 61a so that the opening of the groove 61c is blocked by its outer circumferential portion. A spacer 64 is stacked in the upper side of FIG. 3 of the leaf valve V51, and the leaf valve V51 bends the outer circumference side relative to the spacer 64 toward the upper side of FIG. 3 to open the groove 61c. For this reason, the leaf valve V51 serves as a check valve that allows a flow of the hydraulic fluid directed from the hydraulic reservoir R1 to the pressurizing chamber L3 and suppresses an opposite flow.

The supply passage P31 penetrating the bottom rod 6 has a shape similar to that of a damping force adjustment bypass passage that bypasses the base member 5 and allows the pressurizing chamber L3 and the contraction-side chamber L2 to communicate with each other. Therefore, a process for forming the bypass passage and a process for forming the supply passage P31 can be partially commonalized, so that it is possible to reduce the manufacturing cost of the front fork F. Alternatively, the supply passage P31 may arbitrarily change and as long as the reservoir R and the pressure chamber L can communicate with each other.

The leaf valve V51 is a thin annular plate and is not thickened in the axial direction. Therefore, even when a check valve that allows only a flow of the hydraulic fluid directed from the reservoir R to the pressure chamber L is installed in the bottom rod 6, it is possible to suppress a stroke length of the front fork F from being shortened or suppress the front fork F from being thickened in the axial direction. However, a configuration or a position of the check valve may be arbitrarily changed.

The support member 62 of the bottom rod 6 has a bottomed tubular connecting portion 62a screwed to the outer circumference of the shaft member 60 and an annular flange portion 62b overhanging outward from the lower end of FIG. 3 of the connecting portion 62a. The outer diameter of the flange portion 62b is larger than the inner diameter of the cylinder 1. For this reason, the bottom rod 6 is inserted to the cylinder 1 from the lower side of FIG. 3 while the base member 5, the extension-side leaf valve V3, the contraction-side leaf valve V4, and the leaf valve V51 (hereinafter, referred to as a base member and the like) are installed in the bottom rod 6, and the cylinder 1 is screwed to the wheel-side bracket B2. As a result, the flange portion 62b is interposed between the cylinder 1 and the wheel-side bracket B2, and the base member and the like are fixed to the cylinder 1.

A method of fixing the base member and the like to the cylinder 1 may change arbitrarily. For example, the base member and the like may be fixed to the cylinder 1 by fixing the bottom rod 6 to the wheel-side bracket B2 using a bolt.

The free piston 2 making sliding contact with the outer circumferential surface of the bottom rod 6 and the inner circumferential surface of the cylinder 1 is formed in an annular shape. An annular outer circumferential seal 20 is installed on the outer circumferential surface of the free piston 2 to seal a gap between the inner circumferential surface of cylinder 1 and the outer circumferential surface of the free piston 2. An annular inner circumferential seal 21 is installed on the inner circumferential surface of the free piston 2 to seal a gap between the outer circumferential surface of the bottom rod 6 and the inner circumferential surface of the free piston 2. The free piston 2 makes sliding contact with the outer circumferential surface of the shaft member 60 of the bottom rod 6 and can advance until it abuts on the valve holding member 61.

The pressurizing spring 8 is a coil spring. As the pressurizing spring 8 is compressed, a repulsion force is exerted so that the free piston 2 is biased toward the pressure chamber L side. As the biasing force from the pressurizing spring 8 is received, the free piston 2 pressurizes the pressure chamber L. In this manner, since the pressure chamber L is pressurized by the free piston 2 and the pressurizing spring 8, it is possible to provide excellent damping force responsiveness. In addition, the pressurizing spring 8 is expanded maximally while the free piston 2 advances most, so that it is not separated from the free piston 2 at all times. For this reason, it is possible to suppress a strange noise that may be generated when the pressurizing spring 8 between the free piston 2 and the flange portion 62b is fitted loose and makes contact with the free piston 2 or the flange portion 62b. If the strange noise is suppressed as silent as a passenger does not recognize it, a slight gap between the free piston 2 and the pressurizing spring 8 may be generated when the pressurizing spring 8 is extended maximally. Although the pressurizing spring 8 is a coil spring in this embodiment, it may be a dish spring or any other type of spring.

Next, an operation of the front fork F will be described.

In an extension stroke of the front fork F in which the inner tube t2 retreats from the outer tube t1, and the piston rod 4 retreats from the cylinder 1, the extension-side chamber L1 is pressurized by the piston 3, and the contraction-side chamber L2 is depressurized. As a result, the extension-side leaf valves V1 and V3 are opened, so that the hydraulic fluid flows from the extension-side chamber L1 to the contraction-side chamber L2 through the extension-side passage 3a of the piston 3 and flows from the pressurizing chamber L3 to the contraction-side chamber L2 through the extension-side passage 5a of the base member 5. In this case, the front fork F predominantly generates an extension-side damping force caused by the resistance caused when the hydraulic fluid passes through the extension-side passage 3a of the piston 3.

In the extension stroke of the front fork F, a capacity of the cylinder 1 corresponding to a volume of the piston rod 4 retreating from the cylinder 1 increases. Therefore, the free piston 2 advances toward the upper side of FIG. 2 so that the hydraulic fluid outside the cylinder 1 flows to the inside of the cylinder 1 through the through holes 1a. In this manner, an increase of the capacity of the cylinder 1 caused by extension of the front fork F is compensated by the reservoir R.

In contrast, in a contraction stroke of the front fork F in which the inner tube t2 enters the outer tube t1, and the piston rod 4 enters the cylinder 1, the contraction-side chamber L2 are pressurized by the piston 3, and the extension-side chamber L1 is depressurized. As a result, the contraction-side leaf valves V2 and V4 are opened, so that the hydraulic fluid flows from the contraction-side chamber L2 to the extension-side chamber L1 through the contraction-side passage 3b of the piston 3 and flows from the contraction-side chamber L2 to the pressurizing chamber L3 through the contraction-side passage 5b of the base member 5. In this case, the front fork F predominantly generates a contraction-side damping force caused by the resistance caused when the hydraulic fluid passes through the contraction-side passage 5b of the base member 5.

In the contraction stroke of the front fork F, a capacity of the cylinder 1 corresponding to the volume of the piston rod 4 entering the cylinder 1 is reduced. Therefore, the free piston 2 retreats toward the lower side of FIG. 2, and the hydraulic fluid inside the cylinder 1 flows to the outside of the cylinder 1 through the through holes 1a. In this manner, a decrease of the capacity of the cylinder 1 caused by contraction of the front fork F is compensated by the reservoir R.

If the front fork F is extended while the free piston 2 abuts on the valve holding member 61 due to a temperature decrease of the hydraulic fluid or the like, advancement of the free piston 2 is restricted. However, the outer circumference of the leaf valve V51 is bent upward, and the supply passage P31 is opened. For this reason, the hydraulic fluid of the reservoir R is supplied to the pressurizing chamber L3, so that it is possible to prevent deficiency of the hydraulic fluid in the pressure chamber L. In addition, when the front fork F is switched to the contraction stroke, the leaf valve V51 is closed, so that communication of the supply passage P31 is blocked.

If the front fork F is extended while advancement of the free piston 2 is restricted, and if it is difficult to supply the hydraulic fluid from the reservoir R to the pressure chamber L, the contraction-side chamber L2 has a negative pressure, so that bubbles may be generated. In this case, in the subsequent contraction stroke, the contraction-side chamber L2 is not rapidly pressurized, and the responsiveness of the contraction-side damping force is dropped. However, since the front fork F according to this embodiment is provided with the supply passage P31 and the leaf valve V51, the contraction-side chamber L2 does not have a negative pressure, and it is possible to maintain excellent damping force responsiveness.

In order to prevent an excessive pressure of the pressure chamber L, the front fork may have a relief function for discharging the hydraulic fluid of the pressure chamber L to the reservoir R when the free piston 2 retreats by a predetermined length. In this case, the passage and the check valve according to the present invention (the supply passage P31 and the leaf valve V51 according to this embodiment) are particularly effective. Specifically, if the front fork F is repeatedly extended and contracted, and the hydraulic fluid has a high temperature, so that the front fork F is contracted maximally while the volume of the hydraulic fluid is expanded, the liquid of the pressure chamber L flows to the reservoir R by virtue of the relief function described above, and a liquid amount of the pressure chamber L may decrease in some cases. If the temperature decreases later, and the front fork F is extended maximally while the volume of the hydraulic fluid is reduced, it is conceived that the front fork F is extended while advancement of the free piston 2 is restricted. For this reason, it is highly effective if the supply passage (passage) P31 and the leaf valve (check valve) V51 are provided in the front fork having the relief function.

According to this embodiment, the supply passage P31 communicates with the pressurizing chamber L3 and the hydraulic reservoir R1. For this reason, even when there is a leakage while the leaf valve V51 closes the supply passage P31, it does not easily influence the damping force. Therefore, it is not necessary to manage the leaf valve V51 and a seat portion where the leaf valve V51 seats with high accuracy, and it is possible to reduce the manufacturing cost of the front fork F. The supply passage P31 may have any configuration as long as the hydraulic fluid can be supplied from the reservoir R to the pressure chamber L. For example, the supply passage P31 may be configured to allow the contraction-side chamber L2 and the hydraulic reservoir R1 to communicate with each other.

Functional effects of the front fork F according to this embodiment will now be described.

The check valve is the leaf valve V51 provided in the pressurizing chamber L3 side of the base member 5. In addition, the valve holding member 61 has the connecting portion 61a screwed to the outer circumference of the shaft member 60 and the installation portion 61b extending from the connecting position 61a to the upper side of FIG. 3 (opposite to the free piston side) and having an outer diameter smaller than that of the connecting portion 61a. The installation portion 61b penetrates the cores of the base member 5 and the leaf valve V51, and the base member 5 and the leaf valve V51 are interposed and held between the nut 63 screwed to the tip of the installation portion 61b and the connecting portion 61a.

In this configuration, since the leaf valve V51 is a thin annular plate, it is not thickened in the axial direction, and it is possible to suppress the stroke length of the front fork F from being shortened or the front fork F from being thickened in the axial direction. In addition, since the leaf valve 51 is installed at the same time when the base member 5 is installed in the valve holding member 61, it is possible to provide excellent assemblability and reduce the manufacturing cost of the front fork F.

The check valve that opens or closes the supply passage P31 may have any configuration other than the leaf valve V51, and the check valve may also have any configuration. For example, instead of the leaf valve V51, a valve body V52 of the second embodiment or a check valve V54 of the fourth embodiment described below may be employed. In addition, a configuration of the supply passage P31, a position of the check valve, and the like may change as appropriate depending on the shape of the check valve.

The bottom rod 6 has the shaft member 60 having an outer circumference where the free piston 2 makes sliding contact and the valve holding member 61 installed in the outer circumference of one end of the shaft member 60 to hold the base member 5. The shaft member 60 is provided with the axial hole 60a penetrating the core of the shaft member 60 and the lateral through holes 60b that allow the axial hole 60a and the reservoir R to communicate with each other. The valve holding member 61 is provided with a communicating hole 61d that allows the axial hole 60a and the pressurizing chamber L3 to communicate with each other. The supply passage P31 includes the communicating hole 61d, the axial hole 60a, and the lateral through holes 60b.

In this configuration, the supply passage P31 is similar to the bypass passage that bypasses the base member 5 and allows the contraction-side chamber L2 and the pressurizing chamber L3 to communicate with each other. Therefore, it is possible to partially commonalize a process for forming the bypass passage and a process for forming the supply passage P31 and reduce the manufacturing cost of the front fork F. In addition, in the aforementioned configuration, the bottom rod 6 can be formed by individually forming the shaft member 60 and the valve holding member 6 and then assembling them by screwing. For this reason, it is possible to easily form the supply passage P31 and simplify the shapes of the shaft member 60 and the valve holding member 61. Therefore, it is possible to easily form the bottom rod 6 and reduce the manufacturing cost of the front fork F.

The configurations of the supply passage P31 and the bottom rod 6 may change arbitrarily. For example, the shaft member 60 and the valve holding member 61 may be integrated with each other to provide a single seamless part.

The front fork F has the base member 5 provided between the piston 3 and the free piston 2 inside the cylinder 1 to partition the pressure chamber L into the contraction-side chamber L2 and the pressurizing chamber L3. The supply passage (passage) P31 allows the pressurizing chamber L3 and the reservoir R to communicate with each other.

In this configuration, even when there is a leakage while the supply passage (passage) P31 is closed by the leaf valve (check valve) V51, it does not influence the damping force. Therefore, it is not necessary to manage the leaf valve (check valve) V51 and a seat portion where the leaf valve V51 seats with high accuracy, and it is possible to reduce the manufacturing cost of the front fork F.

A configuration of the supply passage P31 may change arbitrarily as long as it allows the pressure chamber L and the reservoir R to communicate with each other. For example, the supply passage P31 may be configured to allow the contraction-side chamber L2 and the hydraulic reservoir R1 to communicate with each other. In addition, the pressure chamber L may not have the pressurizing chamber L3 by removing the base member 5. Instead, the free piston 2 may make face the contraction-side chamber L2. In this case, the contraction-side chamber L2 and the hydraulic reservoir R1 communicate with each other through the supply passage P31 without changing the shape of FIG. 3.

The front fork F has the bottom rod 6 erected inside the cylinder 1 and provided with an outer circumference where the free piston 2 makes sliding contact. The supply passage (passage) P31 is formed in the bottom rod 6, and the leaf valve (check valve) V51 is installed in the bottom rod 6.

In this configuration, it is possible to improve freedom in designing the supply passage P31 and the check valve (leaf valve V51 in this embodiment). In addition, the leaf valve (check valve) V51 and the free piston 2 are integrally installed in the cylinder 1 while they are installed in the bottom rod 6. Therefore, it is possible to provide excellent assemblability.

In a case where the front fork F is provided with the base member 5 as in this embodiment, the bottom rod 6 that holds the base member 5 is used to form the supply passage P31 and install the leaf valve (check valve) V51. Therefore, it is possible to suppress an increase of the number of components. The member for forming the supply passage P31 and installing the leaf valve (check valve) V51 may have an arbitrary configuration without limiting to the bottom rod 6. For example, this member may be the free piston 2.

The front fork F is provided with the pressurizing spring 8 that pressurizes the pressure chamber L by interposing the free piston 2.

In this configuration, it is possible to provide excellent damping force responsiveness. In addition, in a case where the front fork F has the pressurizing spring 8, it is possible to prevent a strange noise. Therefore, it is desirable to suppress separation between the free piston 2 and the pressurizing spring 8 by restricting advancement of the free piston 2 by a predetermined length. However, if the piston rod 4 retreats from the cylinder 1 while advancement of the free piston 2 is restricted, the hydraulic fluid becomes deficient in the pressure chamber L. This may degrade the damping force response. Therefore, the passage (the supply passage P31 in this embodiment) and the check valve (the leaf valve V51 in this embodiment) according to the present invention are effective particularly when the front fork F has the pressurizing spring 8. Alternatively, the present invention may also be employed in a front fork in which advancement of the free piston 2 is restricted due to other reasons.

The front fork F includes a tubular cylinder 1, a free piston 2 slidably inserted into the cylinder 1 to partition the cylinder 1 into the pressure chamber L filled with a hydraulic fluid and the reservoir R enclosed with the hydraulic fluid and the gas, a piston 3 slidably inserted into the cylinder 1 to partition the pressure chamber L into the extension-side chamber L1 and the contraction-side chamber L2, a piston rod 4 having one end (lower end of FIG. 2) connected to the piston 3 and the other end side (upper side of FIG. 2) extending oppositely to the free piston side and protruding outward of the cylinder 1, a supply passage (passage) P31 that allows the pressure chamber L and the reservoir R to communicate with each other, and a leaf valve (check valve) V51 provided in the supply passage (passage) P31 to allow only a flow of the hydraulic fluid directed from the reservoir R to the pressure chamber L.

In this configuration, even when the piston rod 4 retreats from the cylinder 1 while advancement of the free piston 2 is restricted, the hydraulic fluid is supplied from the reservoir R to the pressure chamber L through the supply passage P31. Therefore, it is possible to prevent deficiency of the hydraulic fluid in the pressure chamber L. As a result, it is possible to maintain excellent damping force responsiveness.

<Second Embodiment>

A front fork according to the second embodiment of the invention will now be described with reference to FIG. 4.

A basic configuration of the front fork according to this embodiment is similar to that of the front fork F of the first embodiment. The front fork according to this embodiment is predominantly different from that of the first embodiment in the passage (supply passage P31) that allows the pressure chamber L and the reservoir R to communicate with each other and the check valve (leaf valve V51) provided in this passage. The following description will be made by focusing on these different parts. In addition, like reference numerals denote like elements as in the first embodiment, and they will not be described repeatedly.

According to this embodiment, a supply passage P32 that allows the pressure chamber L and the reservoir R to communicate with each other is formed in the bottom rod 6, and the contraction-side chamber L2 and the hydraulic reservoir R1 communicate with each other. Specifically, the valve holding member 61 is provided with a valve housing 61e formed in a top portion of the connecting portion 61a and a communicating hole 61f formed in the installation portion 61b to allow the valve housing 61e and the contraction-side chamber L2 to communicate with each other. The axial hole 60a and the communicating hole 61f have diameters smaller than that of the valve housing 61e. In addition, a cutout portion 61g is provided in a step portion of the valve holding member 61 where the valve housing 61e and the communicating hole 61f adjoin each other. The supply passage P32 includes the communicating hole 61f, the cutout portion 61g, the valve housing 61e, the axial hole 60a, and the lateral through holes 60b.

The check valve that opens or closes the supply passage P32 is a spherical valve body V52 and is housed in the valve housing 61e. The diameter of the valve body V52 is set such that it can move along the valve housing 61e in the axial direction (vertical direction in FIG. 4) without passing through the communicating hole 61f and the axial hole 60a. As the valve body V52 moves downward in FIG. 4 and abuts on the shaft member 60, the upper opening of the axial hole 60a in FIG. 4 is blocked, and the supply passage P32 is closed. In contrast, as the valve body V52 moves upward in FIG. 4, the axial hole 60a is opened, and the supply passage P32 is opened. In addition, even when the valve body V52 abuts on the valve holding member 61, a gap is formed between the valve holding member 61 and the valve body V52 due to the cutout portion 61g. Therefore, the open state of the supply passage P32 is maintained due to this gap. Therefore, the valve body V52 serves as a check valve that allows a flow of the hydraulic fluid directed from the hydraulic reservoir R1 to the contraction-side chamber L2 and suppresses an opposite flow.

Next, operations of the front fork according to this embodiment will be described by focusing on the difference from the first embodiment.

Figure 4:
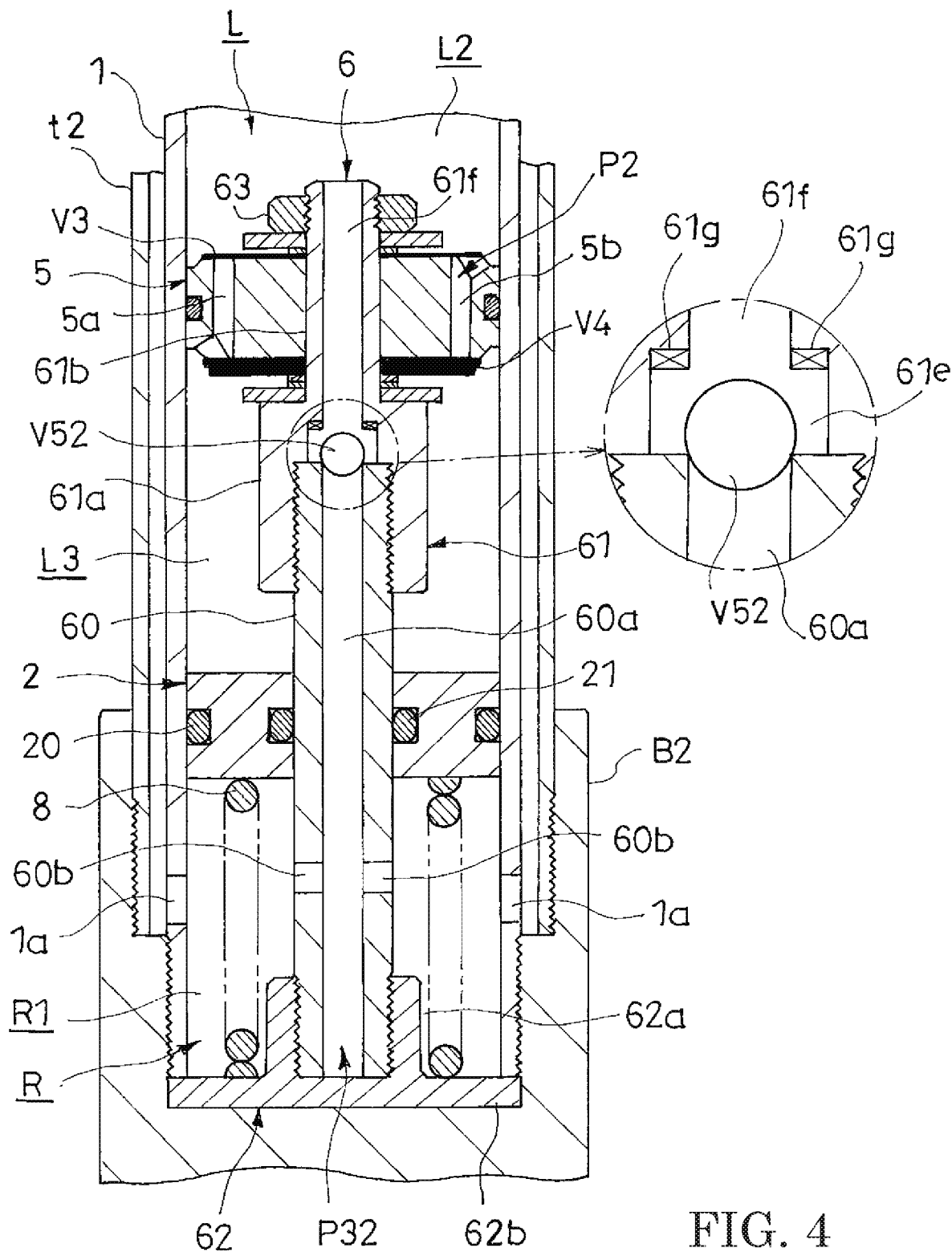
FIG. 4 is an enlarged longitudinal cross-sectional view partially illustrating main parts of a front fork according to a second embodiment of the invention.

If the piston rod 4 retreats from the cylinder 1 while the free piston 2 abuts on the valve holding member 61 due to a temperature decrease of the hydraulic fluid or the like, the valve body V52 moves upward in FIG. 4 and opens the supply passage P32 although advancement of the free piston 2 is restricted. For this reason, the hydraulic fluid of the reservoir R is supplied to the contraction-side chamber L2, so that deficiency of the hydraulic fluid in the pressure chamber L is prevented. In addition, if the front fork is switched to the contraction stroke, the valve body V52 moves downward in FIG. 4 and abuts on the shaft member 60. Therefore, communication of the supply passage P32 is blocked.

Next, functional effects of the front fork according to this embodiment will be described by focusing on the difference from the first embodiment.

According to this embodiment, the check valve is the spherical valve body V52 and is housed in the valve housing 61e provided in the bottom rod 6. Therefore, even when the valve body (check valve) V52 is installed in the bottom rod 6, it is possible to suppress the stroke length of the front fork F from being shortened or the front fork F from being thickened in the axial direction.

The configurations of the supply passage (passage) P32 that allows the contraction-side chamber L2 and the hydraulic reservoir R1 to communicate with each other and the check valve provided in this supply passage P32 may change arbitrarily. For example, instead of the valve body V52, the leaf valve of the first embodiment may also be employed. The check valve of the fourth embodiment described below may also be employed. In addition, the configuration of the supply passage P32, the position of the check valve, and the like may change as appropriate depending on the shape of the check valve. Furthermore, the valve body V52 may be provided in the supply passage that allows the pressurizing chamber L3 and the hydraulic reservoir R1 to communicate with each other.

<Third Embodiment>

Figure 5:
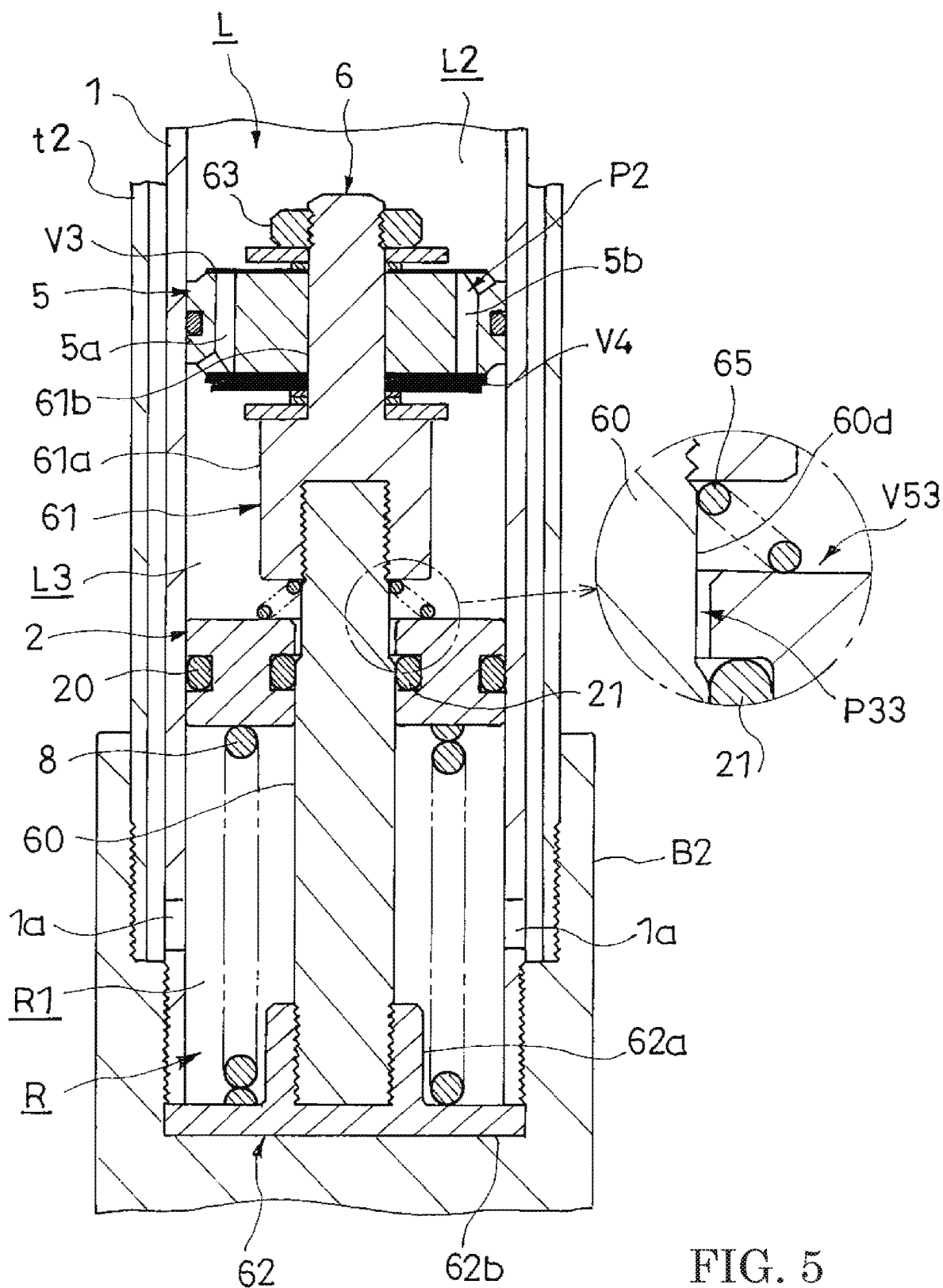
FIG. 5 is an enlarged longitudinal cross-sectional view partially illustrating main parts of a front fork according to a third embodiment of the invention.

A front fork according to the third embodiment of the invention will now be described with reference to FIG. 5. A basic configuration of the front fork according to this embodiment is similar to that of the front fork F of the first embodiment. The front fork according to this embodiment is predominantly different from that of the first embodiment in the passage (supply passage P31) that allows the pressure chamber L and the reservoir R to communicate with each other and the check valve (leaf valve V51) provided in this passage. The following description will be made by focusing on these different parts. In addition, like reference numerals denote like elements as in the first embodiment, and they will not be described repeatedly.

According to this embodiment, the supply passage P33 that allows the pressure chamber L and the reservoir R to communicate with each other is formed by a recess 60d provided in an outer circumference of the shaft member 60, so that the pressurizing chamber L3 and the hydraulic reservoir R1 communicate with each other. The recess 60d has an outer diameter smaller than that of a sliding portion of the shaft member 60 where the inner circumferential seal 21 of the free piston 2 makes sliding contact. If the free piston 2 advances, and the inner circumferential seal 21 reaches the recess 60d, a gap is generated between the inner circumferential seal 21 and the shaft member 60, and this gap serves as a supply passage P33, so that the pressurizing chamber L3 and the hydraulic reservoir R1 communicate with each other.

A biasing spring 65 is provided between the free piston 2 and the valve holding member 61. As the free piston 2 reaches the recess 60d, the biasing spring 65 is compressed to exert a repulsion force, so that the free piston 2 is biased to retreat. As the free piston 2 retreats by receiving the biasing force of the biasing spring 65, the inner circumferential seal 21 is separated from the recess 60d and makes sliding contact with a sliding portion of the shaft member 60, so that the supply passage P33 is closed. That is, the free piston 2 serves as a valve body of the check valve V53 for opening or closing the supply passage P33 and is biased by the biasing spring 65 so as to close the supply passage P33.

Next, operations of the front fork according to this embodiment will be described by focusing on the difference from the first embodiment.

If the free piston 2 advances until the inner circumferential seal 21 reaches the recess 60d, the free piston 2 opens the supply passage P33 while more advancement of the free piston 2 is restricted. For this reason, even when the piston rod 4 retreats from the cylinder 1 while advancement of the free piston 2 is restricted due to a temperature decrease of the hydraulic fluid and the like, the hydraulic fluid of the reservoir R is supplied to the pressurizing chamber L3 through the supply passage P33. Therefore, it is possible to prevent deficiency of the hydraulic fluid in the pressure chamber L. In addition, in a case where the front fork is switched to the contraction stroke, the free piston 2 moves downward in FIG. 5 by the biasing spring 65, and the inner circumferential seal 21 makes sliding contact with the sliding portion of the shaft member 60. Therefore, communication of the supply passage P33 is blocked.

Next, functional effects of the front fork according to this embodiment will be described by focusing on the difference from the first embodiment.

According to this embodiment, the front fork has the bottom rod 6 erected inside the cylinder 1 and provided with an outer circumference where the free piston 2 makes sliding contact. The supply passage (passage) P33 is formed by the recess 60d provided in the outer circumference of the bottom rod 6. The check valve V53 has the free piston 2 that opens or closes the supply passage (passage) P33 and the biasing spring 65 that biases the free piston 2 toward the close direction. As the free piston 2 reaches the recess 60d, the supply passage (passage) P33 is opened.

In this configuration, the free piston 2 also serves as a valve body of the check valve V53. Therefore, it is possible to reduce the number of components. In addition, since the supply passage P33 is formed by the recess 60d provided in the outer circumference of the bottom rod 6, it is possible to easily fabricate the supply passage P33. Therefore, it is possible to reduce the manufacturing cost of the front fork.

According to this embodiment, the recess 60d is formed in the outer circumference of the shaft member 60 along a circumferential direction, and a portion where the recess 60d is provided has an outer diameter smaller than that of the sliding portion. In addition, the outer circumference of the lower end of FIG. 5 of the recess 60d has a tapered shape in which the outer diameter gradually increases toward the sliding portion. Therefore, it is possible to suppress scratching of the inner circumferential seal 21. However, the shape of the recess 60d may change arbitrarily as long as a gap can be formed between the bottom rod 6 and the free piston 2 to flow the hydraulic fluid. For example, the recess 60d may be a longitudinal groove extending in the axial direction of the shaft member 60.

<Fourth Embodiment>

A front fork according to the fourth embodiment of the invention will now be described with reference to FIG. 6. A basic configuration of the front fork according to this embodiment is similar to that of the front fork F of the first embodiment. The front fork according to this embodiment is predominantly different from that of the first embodiment in the passage (supply passage P31) that allows the pressure chamber L and the reservoir R to communicate with each other and the check valve (leaf valve V51) provided in this passage. The following description will be made by focusing on these different parts. In addition, like reference numerals denote like elements as in the first embodiment, and they will not be described repeatedly.

Figure 6:
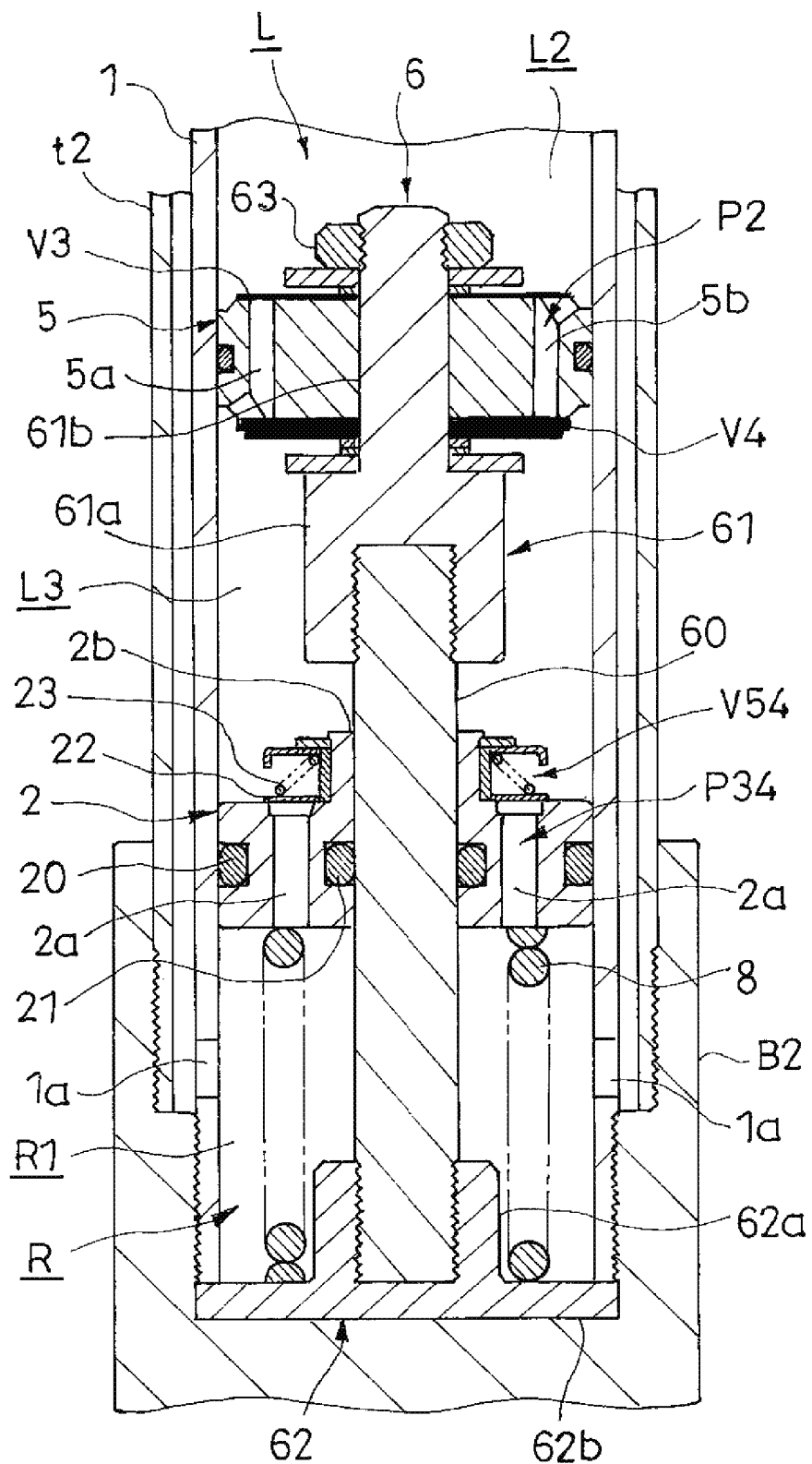
FIG. 6 is an enlarged longitudinal cross-sectional view partially illustrating main parts of a front fork according to a fourth embodiment of the invention.

According to this embodiment, the supply passage P34 that allows the pressure chamber L and the reservoir R to communicate with each other is formed by a axial hole 2a penetrating the free piston 2 vertically in FIG. 6.

An annular installation portion 2b erected upward from the inside of the upper opening of FIG. 6 of the axial hole 2a is provided in the upper side of FIG. 6 of the free piston 2. In addition, the free piston 2 is installed with a check valve V54 provided with a disk valve 22 that moves in the axial direction along the outer circumferential surface of the installation portion 2b and a biasing spring 23 that biases the disk valve 22 toward the free piston 2. As the disk valve 22 is pressed by the free piston 2 by virtue of the biasing force of the biasing spring 23, the opening of the axial hole 2a is blocked, and the supply passage P34 is closed. In contrast, if the disk valve 22 recedes from the free piston 2 resisting to the biasing force of the biasing spring 23, the axial hole 2a is opened, and the supply passage P34 is opened. Therefore, the check valve V54 allows a flow of the hydraulic fluid directed from the hydraulic reservoir R1 to the pressurizing chamber L3 and suppresses an opposite flow.

Next, operations of the front fork according to this embodiment will be described by focusing on the difference from the first embodiment.

If the piston rod 4 retreats from the cylinder 1 while the free piston 2 abuts on the valve holding member 61 due to a temperature decrease of the hydraulic fluid or the like, the disk valve 22 moves upward in FIG. 6 while advancement of the free piston 2 is restricted. That is, since the check valve V54 opens the supply passage P34, the hydraulic fluid of the reservoir R is supplied to the pressurizing chamber L3, so that it is possible to prevent deficiency of the hydraulic fluid in the pressure chamber L. In addition, if the front fork is switched to the contraction stroke, the disk valve 22 moves downward in FIG. 6 so as to block the axial hole 2a. Therefore, communication of the supply passage P34 is blocked by the check valve V54.

Next, functional effects of the front fork according to this embodiment will be described by focusing on the difference from the first embodiment.

According to this embodiment, the supply passage (passage) P34 is formed in the free piston 2, and the check valve V54 is installed in the free piston 2.

In this configuration, even when the base member 5 and the bottom rod 6 are removed, it is possible to easily prevent deficiency of the hydraulic fluid in the pressure chamber L.

Although the check valve V54 installed in the free piston 2 has the disk valve 22 and the biasing spring 23 in this embodiment, the configuration of the check valve V54 may change arbitrarily. For example, the check valve V54 may be a leaf valve illustrated in FIG. 3 or a spherical valve body illustrated in FIG. 4. In addition, the check valve V54 according to this embodiment may also be employed in the front fork of the first and second embodiment.

The configuration, the functions, and the effects of the embodiments of the invention will be described in summary.

According to the embodiments, the front fork has a passage that allows the pressure chamber and the reservoir partitioned by the free piston to communicate with each other, and a check valve provided in the passage to allow only a flow of the hydraulic fluid from the reservoir to the pressure chamber. Therefore, in a case where the hydraulic fluid is deficient in the pressure chamber, the check valve is opened so that the hydraulic fluid is supplied from the reservoir to the pressure chamber. For this reason, it is possible to prevent bubbles from being generated in the contraction-side chamber due to negative pressure in the contraction-side chamber. Therefore, it is possible to maintain excellent responsiveness for generating the damping force.

According to the embodiments, the front fork has a pressurizing spring for pressurizing the pressure chamber by interposing the free piston. In this configuration, it is possible to provide excellent damping force responsiveness and provide high effectiveness by providing the passage and the check valve.

According to the embodiments, the front fork has the bottom rod having an outer circumference where the free piston makes sliding contact. In addition, the passage is formed in the bottom rod, and the check valve is installed in the bottom rod. For this reason, it is possible to provide excellent freedom in designing the passage and the check valve. In addition, since the check valve and the free piston can be integrally installed in the cylinder while they are installed in the bottom rod, it is possible to provide excellent assemblability.

According to the embodiments, the front fork has the bottom rod having an outer circumference where the free piston makes sliding contact. In addition, the passage is formed by the recess provided in the outer circumference of the bottom rod, and the check valve has the free piston that opens or closes the passage and the biasing spring that biases the free piston toward the close direction. When the free piston reaches the recess, the passage is opened. In this configuration, since the free piston also serves as the valve body of the check valve, it is possible to reduce the number of components. Furthermore, since the passage is formed by the recess provided in the outer circumference of the bottom rod, it is possible to easily fabricate the passage. Therefore, it is possible to reduce the manufacturing cost of the front fork.

According to the embodiments, the passage is formed in the free piston, and the check valve is installed in the free piston. In this configuration, even when the front fork is not provided with the base member and the bottom rod, it is possible to easily prevent deficiency of the hydraulic fluid in the pressure chamber.

According to the embodiments, the front fork has the base member provided between the piston and the free piston inside the cylinder to partition the pressure chamber into the contraction-side chamber and the pressurizing chamber. In addition, the passage allows the pressurizing chamber and the reservoir to communicate with each other. In this configuration, even when there is a leakage when the passage is closed by the check valve, it does not easily influence the damping force. Therefore, it is not necessary to manage the check valve and a seat portion where the check valve seats with high accuracy, and it is possible to reduce the manufacturing cost of the front fork.

According to the embodiments, the bottom rod has the shaft member having an outer circumference where the free piston makes sliding contact, and the valve holding member installed in one end of the shaft member to hold the base member. The shaft member is provided with the axial hole passing through the core of the shaft member and the lateral through holes that allow the axial hole and the reservoir to communicate with each other. The valve holding member is provided with the communicating hole that allow the axial hole and the pressurizing chamber to communicate with each other, and the passage includes the communicating hole, the axial hole, and the lateral through holes. In this configuration, the passage according to the present invention is similar to a bypass passage that bypasses the base member and allows the contraction-side chamber and the pressurizing chamber to communicate with each other. Therefore, it is possible to partially commonalize the process for forming the bypass passage and the process for forming the passage according to the present invention. As a result, it is possible to reduce the manufacturing cost of the front fork.

According to the embodiments, the shaft member and the valve holding member are individually formed, and they are then integrated to each other to form the bottom rod. For this reason, it is possible to easily form the passage and simplify the shapes of the shaft member and the valve holding member. Therefore, it is possible to easily form the bottom rod and reduce the manufacturing cost of the front fork.

According to the embodiments, the check valve is the leaf valve and is provided in the pressurizing chamber side of the base member. The valve holding member has the connecting portion screwed to the outer circumference of the shaft member and the installation portion extending from the connecting portion oppositely to the free piston side and having an outer diameter smaller than the outer diameter of the connecting portion. The installation portion penetrates the cores of the base member and the check valve. The base member and the check valve are interposed and held between the nut screwed to the tip of the installation portion and the connecting portion. In this configuration, since the leaf valve is a thin annular plate, it is not thickened in the axial direction. In addition, it is possible to suppress the stroke length of the front fork from being shortened and the front fork from being thickened in the axial direction. Furthermore, the leaf valve is installed at the same time when the base member is installed in the valve holding member, it is possible to provide excellent assemblability and reduce the manufacturing cost of the front fork.

Embodiments of this invention were described above, but the above embodiments are merely examples of applications of this invention, and the technical scope of this invention is not limited to the specific constitutions of the above embodiments.

This application claims priority based on Japanese Patent Application No. 2015-055287 filed with the Japan Patent Office on Mar. 18, 2015, the entire contents of which are incorporated into this specification.

The invention claimed is:

1. A front fork comprising:
a tubular cylinder;
a free piston slidably inserted into the cylinder to partition the cylinder into a pressure chamber filled with a hydraulic fluid and a reservoir enclosed with a hydraulic fluid and a gas;
a piston slidably inserted into the cylinder to partition the pressure chamber into an extension-side chamber and a contraction-side chamber;
a piston rod having one end connected to the piston and another end extending oppositely to a free piston side and protruding outward of the cylinder;
a passage configured to allow the pressure chamber and the reservoir to communicate with each other;
a check valve provided in the passage and configured to allow only a flow of the hydraulic fluid from the reservoir to the pressure chamber; and
a base member fixedly supported in the cylinder between the piston and the free piston inside the cylinder to form a pressurizing chamber between the base member and the free piston, the free piston being configured to move relative to the base member, wherein the passage is configured to allow the pressurizing chamber or the contraction-side chamber to communicate with the reservoir.

2. The front fork according to claim 1, further comprising a pressurizing spring that pressurizes the pressure chamber by interposing the free piston.

3. The front fork according to claim 1, further comprising a bottom rod erected inside the cylinder and having an outer circumference where the free piston makes sliding contact,
   wherein the passage is formed in the bottom rod, and
   the check valve is installed in the bottom rod.

4. The front fork according to claim 1, further comprising a bottom rod erected inside the cylinder and having an outer circumference where the free piston makes sliding contact,
   wherein the passage is formed by a recess provided in the outer circumference of the bottom rod,
   the check valve has the free piston, the free piston opening or closing the passage, and a biasing spring configured to bias the free piston toward a close direction, and
   the passage is opened when the free piston reaches the recess.

5. The front fork according to claim 1, wherein the passage is formed in the free piston, and
   the check valve is installed in the free piston.

6. The front fork according to claim 1, further comprising a bottom rod erected inside the cylinder and having an outer circumference where the free piston makes sliding contact,
   wherein the passage is formed in the bottom rod,
   the check valve is installed in the bottom rod,
   the bottom rod has
      a shaft member having an outer circumference where the free piston makes sliding contact, and
      a valve holding member installed in one end of the shaft member to hold the base member,
   the shaft member is provided with an axial hole passing through a core of the shaft member and a lateral through hole that allows the axial hole and the reservoir to communicate with each other,
   the valve holding member is provided with a communicating hole that allows the axial hole and the pressurizing chamber to communicate with each other, and
   the passage includes the communicating hole, the axial hole, and the lateral through hole.

7. The front fork according to claim 6, wherein the check valve is a leaf valve and is provided in a pressurizing chamber side of the base member,
   the valve holding member has
      a connecting portion screwed to an outer circumference of the shaft member, and
      an installation portion extending from the connecting portion oppositely to the free piston side and having an outer circumference smaller than an outer circumference of the connecting portion,
   the installation portion penetrates cores of the base member and the check valve, and
   the base member and the check valve are interposed and held between a nut screwed to a tip of the installation portion and the connecting portion.

* * * * *